US012488332B2

(12) United States Patent
Sarjaz et al.

(10) Patent No.: US 12,488,332 B2
(45) Date of Patent: Dec. 2, 2025

(54) E-COMMERCE PLATFORM WITH TOKENIZATION SYSTEM

(71) Applicant: Shopify Inc., Ottawa (CA)

(72) Inventors: Behrooz Shafiee Sarjaz, Vancouver (CA); Jason White, Ottawa (CA)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 18/331,125

(22) Filed: Jun. 7, 2023

(65) Prior Publication Data

US 2023/0351368 A1     Nov. 2, 2023

Related U.S. Application Data

(63) Continuation of application No. 16/256,614, filed on Jan. 24, 2019, now abandoned.

(51) Int. Cl.
*G06Q 20/36*     (2012.01)
*H04L 9/08*     (2006.01)
*H04L 9/32*     (2006.01)

(52) U.S. Cl.
CPC ..... *G06Q 20/3672* (2013.01); *G06Q 20/3674* (2013.01); *H04L 9/0847* (2013.01); *H04L 9/3213* (2013.01)

(58) Field of Classification Search
CPC .............. G06Q 20/00–425; H04L 9/00–50
See application file for complete search history.

(56) References Cited

U.S. PATENT DOCUMENTS

| 6,332,193 | B1 | 12/2001 | Glass |
| 6,360,254 | B1 | 3/2002 | Linden et al. |
| 6,848,109 | B1 | 1/2005 | Kuhn |
| 8,800,007 | B1 | 8/2014 | Rajagopalan |
| 10,025,941 | B1 | 7/2018 | Griffin |
| 10,565,596 | B2 * | 2/2020 | DeTella ............... G06F 8/38 |
| 10,878,411 | B2 * | 12/2020 | Ko ................... G06Q 20/3672 |
| 2002/0112178 | A1 | 8/2002 | Scherr |
| 2004/0044791 | A1 | 3/2004 | Pouzzner |

(Continued)

FOREIGN PATENT DOCUMENTS

EP     3687136 A1     7/2020

OTHER PUBLICATIONS

Extended Euroepan Search Report issued in related EP application No. 20153591.1; mailed May 26, 2020.

*Primary Examiner* — Ari Shahabi
(74) *Attorney, Agent, or Firm* — CPST Intellectual Property Inc; Brett J. Slaney

(57) ABSTRACT

Systems and methods for tokenization of sensitive data are described, such as a method that includes receiving data to be protected which is provided by a data provider and obtained by or on behalf of a data controller, determining a data controller ID associated with the data controller and a data provider ID associated with the data provider, and generating, by a tokenization engine, a corresponding token for the data controller ID in combination with the data provider ID and in combination with the data to be protected, wherein the token is a reference that maps back to the data to be protected. The data controller ID in combination with the data provider ID and the data to be protected may be stored in a data vault, wherein the data to be protected is accessible from the data vault when the corresponding token is presented.

20 Claims, 6 Drawing Sheets

(56) References Cited

U.S. PATENT DOCUMENTS

| | | |
|---|---|---|
| 2004/0250119 A1 | 12/2004 | Shelest |
| 2005/0091543 A1 | 4/2005 | Holtzman |
| 2009/0121830 A1 | 5/2009 | Dziadosz |
| 2009/0165125 A1 | 6/2009 | Brown |
| 2009/0179071 A1 | 7/2009 | Backert et al. |
| 2009/0198617 A1 | 8/2009 | Soghoian et al. |
| 2009/0240907 A1 | 9/2009 | Crandell |
| 2009/0292641 A1 | 11/2009 | Weiss |
| 2010/0031349 A1 | 2/2010 | Bingham |
| 2010/0082682 A1 | 4/2010 | Kinoshita |
| 2010/0121765 A1 | 5/2010 | Ahrens |
| 2010/0228991 A1 | 9/2010 | Billings et al. |
| 2010/0281248 A1 | 11/2010 | Lockhart et al. |
| 2012/0041881 A1* | 2/2012 | Basu ............... G06Q 20/3674 705/64 |
| 2013/0080385 A1 | 3/2013 | Ho et al. |
| 2013/0212663 A1 | 8/2013 | Edge et al. |
| 2013/0268649 A1 | 10/2013 | Kinra |
| 2014/0040148 A1 | 2/2014 | Ozvat et al. |
| 2014/0189888 A1 | 7/2014 | Madhok et al. |
| 2015/0150110 A1 | 5/2015 | Canning et al. |
| 2015/0295882 A1 | 10/2015 | Kaliski, Jr. |
| 2015/0341438 A1 | 11/2015 | Sloan |
| 2016/0098708 A1 | 4/2016 | Loomis |
| 2016/0267467 A1 | 9/2016 | Rutherford |
| 2016/0283936 A1* | 9/2016 | Daniel ............... G06Q 50/01 |
| 2017/0109731 A1 | 4/2017 | Parekh |
| 2017/0230351 A1 | 8/2017 | Hallenborg |
| 2017/0337609 A1 | 11/2017 | Turemen |
| 2019/0051079 A1 | 2/2019 | Venkataraman |
| 2019/0089544 A1 | 3/2019 | Yang et al. |
| 2019/0370487 A1* | 12/2019 | Veltman ............... H04L 9/3213 |
| 2020/0051070 A1* | 2/2020 | Yoo ............... H04L 63/0807 |
| 2020/0097950 A1 | 3/2020 | Thompson |

* cited by examiner

| ID Type | ID | Email | Postal Code | Phone | ... |
|---|---|---|---|---|---|
| Shop_ID | 123 | { Token: 369053fb...43<br>Data: john@smith.com<br>},<br>{ Token: 234dsfgd...19<br>Data: support@smith.com<br>}<br>... | { Token: sdfs1231...11<br>Data: K15GT3<br>}<br>... | { Token: pppxss...22<br>Data: 222-333-444<br>}<br>... | ... |
| Buyer_ID | 456 | { Token: zzzcv23d...88<br>Data: jack@jones.com<br>}<br>... | { Token: xcvxcv32...77<br>Data: K15GT3<br>}<br>... | { Token: poicv33...55<br>Data: 777-888-9999<br>}<br>... | ... |
| ... | ... | ... | ... | ... | ... |

FIG. 5

| | Affiliation | | | | | Sensitive Data | | TOKEN |
|---|---|---|---|---|---|---|---|---|
| | Data Controller ID | | | Data Provider ID | | | | |
| | Controller Kind | ID Kind | ID Value | ID Kind | ID Value | Kind | Value | |
| 1 | Platform | N/A | | Customer ID | 456 | Address: | 150 Elgin St, Ottawa, K2P1L4 | TOK123 |
| 2 | Platform | N/A | | Customer ID | 456 | Email: | jack@jones.com | TOK456 |
| 3 | Platform | N/A | | Customer ID | 789 | Address: | 150 Elgin St, Ottawa, K2P1L4 | TOK789 |
| 4 | Platform | N/A | | Customer ID | 789 | Address: | 211 King St, Toronto, L2N3G8 | TOK999 |
| 5 | MERCHANT | SHOP ID | 1234 | EMAIL | aa@bb.ca | lat/long: | 23.23, 44.55 | TOK910 |
| 6 | MERCHANT | SHOP ID | 5678 | EMAIL | aa@bb.ca | lat/long: | 23.23, 44.55 | TOK101 |
| 7 | PARTNER | PARTNER ID | 9101 | EMAIL | cc@dd.jp | Name: | John Smith | TOK222 |
| ... | ... | ... | ... | ... | ... | ... | ... | ... |

FIG. 6

E-COMMERCE PLATFORM WITH TOKENIZATION SYSTEM

CROSS-REFERENCE TO RELATED APPLICATION(S)

This application is a Continuation of U.S. patent application Ser. No. 16/256,614 filed on Jan. 24, 2019, the contents of which are incorporated herein by reference in their entirety.

FIELD

The present disclosure relates generally to a tokenization system, and in particular, tokenizing sensitive data in an e-commerce platform supporting multiple merchants.

BACKGROUND

Tokenization systems are known, wherein sensitive data, such as payment card or bank account numbers, is replaced with a token (in general, a unique, undecipherable reference such as a random number, with no intrinsic value of its own), and the sensitive data is stored in a secure storage or data vault. Tokenization in such systems typically occurs on a granular level, with each piece of information (e.g., first name, last name, email address, and phone number) being tokenized separately. Further, such tokenization systems typically provide the same token for the same input. Such granular tokenization systems may be prone to data leakage. For example, if a small data piece (such as a zip code) is frequently tokenized, resulting in the same token in an unsecure database, an analysis of the tokens themselves may allow the reverse engineering of the underlying data (e.g., figuring out the zip code). Additionally, current tokenization systems do not have data stored at a merchant level and thus are not able to fine tune deletion requests, such as when a customer has secure data stored with multiple merchants but wants to remove information at one merchant only.

SUMMARY

Therefore, there is a need in the art to provide an improved tokenization system.

In embodiments, a method may include receiving, by a tokenization engine, data to be protected which is provided by a data provider and obtained by or on behalf of a data controller. The method may include determining a data controller ID associated with the data controller and a data provider ID associated with the data provider, and generating, by the tokenization engine, a corresponding token for the data controller ID in combination with the data provider ID and in combination with the data to be protected, wherein the token is a reference that maps back to the data to be protected. The data controller ID in combination with the data provider ID and the data to be protected may be stored in a data vault, wherein the data to be protected is accessible from the data vault when the corresponding token is presented.

In embodiments, the data provider may be one of a merchant and a customer of a merchant. The data controller may be one of an e-commerce platform and a merchant. The data to be protected may be personally identifiable information of the data provider. The data to be protected may be an email address, a phone number or a physical address. The tokenization engine may authenticate access to the data to be protected upon receipt of the corresponding token. A different token may be generated for the same data to be protected if associated with a different data controller ID. A different token may be generated for the same data to be protected if associated with a different data provider ID. The tokenization engine may provide placeholder data in the case of a missing data controller ID and/or in the case of a missing data provider ID. The data to be protected in the data vault may be deleted upon receipt of a request by the data provider to delete the data to be protected. The data to be protected may be prevented from being accessed by any entity upon receipt of a request by the provider to delete the data to be protected. The data provider ID and the token may be transmitted for storage in a database of an e-commerce platform. The data provider ID may be an ID kind and an ID value. The data controller ID may be a controller kind, an ID kind, and an ID value. A data analysis may be authorized to be performed on the data controller and the data provider and using the corresponding token as a placeholder. In embodiments, the method may include receiving and authenticating, by the tokenization engine, the corresponding token, and authorizing a data analysis to be performed on the data controller and the data provider using the data to be protected when the corresponding token is authenticated.

In embodiments, a system may include a tokenization engine that receives data to be protected which is provided by a data provider and obtained by or on behalf of a data controller; and a data vault for storing tokens. The tokenization engine may be enabled to determine a data controller ID associated with the data controller and a data provider ID associated with the data provider and generate a corresponding token for the data controller ID in combination with the data provider ID and in combination with the data to be protected, wherein the token is a reference that maps back to the data to be protected. The data vault may store the data controller ID in combination with the data provider ID and the data to be protected, wherein the data to be protected is accessible from the data vault when the corresponding token is presented.

In embodiments, the data provider may be one of a merchant and a customer of a merchant. The data controller may be one of an e-commerce platform and a merchant. The data to be protected may be personally identifiable information of the data provider. The data to be protected may be an email address, a phone number, or a physical address. The tokenization engine may authorize access to the data to be protected upon receipt and authentication of the corresponding token. A different token may be generated for the same data to be protected if associated with a different data controller ID. A different token may be generated for the same data to be protected if associated with a different data provider ID. The tokenization engine may provide placeholder data in the case of a missing data controller ID and in the case of a missing data provider ID. The tokenization engine may act to delete the data to be protected in the data vault upon receipt of a request by the data provider to delete the data to be protected. The tokenization engine may act to prevent the data to be protected from being accessed by any entity upon receipt of a request by the provider to delete the data to be protected. The tokenization engine may act to transmit the data provider ID and the token for storage in a database of an e-commerce platform. The data provider ID may be at least one of a ID kind and an ID value. The data controller ID may be at least one of a controller kind, an ID kind, and an ID value. The tokenization engine may authorize a data analysis to be performed on data relating to the data controller and the data provider and using the corresponding token as a placeholder. The tokenization engine may receive and authenticate the corresponding token, and authorizes a data analysis to be performed on data relating to the data controller and the data provider using the data to be protected when the corresponding token is authenticated.

In embodiments a method may include receiving, by a tokenization engine, data to be protected which is provided by a customer and obtained by or on behalf of a merchant. The method may include determining a merchant ID associated with the merchant and a customer ID associated with the customer and generating, by the tokenization engine, a corresponding token for the merchant ID in combination with the customer ID and in combination with the data to be protected, wherein the token is a reference that maps back to the data to be protected. The merchant ID with the customer ID and the data to be protected may be stored in a data vault, wherein the data to be protected is accessible from the data vault when the corresponding token is presented.

In embodiments, the data to be protected in the data vault may be deleted upon receipt of a request by the customer to delete the data to be protected. The data to be protected may be prevented from being accessed by any entity upon receipt of a request by the customer to delete the data to be protected. The corresponding token may be invalidated upon receipt of a request by the customer to delete the data to be protected. A different token may be generated for the same data to be protected if associated with a different merchant ID. A different token may be generated for the same data to be protected if associated with a different customer ID.

In embodiments, a system may include a tokenization engine that receives data to be protected which is provided by a data customer and obtained by or on behalf of a merchant and a data vault. The tokenization engine may be enabled to determine a merchant ID associated with the merchant and a customer ID associated with the customer and generate a corresponding token for the merchant ID in combination with the customer ID and in combination with the data to be protected, wherein the token is a reference that maps back to the data to be protected. The merchant ID with the customer ID and the data to be protected may be stored in the data vault, wherein the data to be protected is accessible from the data vault when the corresponding token is presented.

In embodiments, the tokenization engine may act to delete the data to be protected in the data vault upon receipt of a request by the customer to delete the data to be protected. The tokenization engine may act to prevent the data to be protected from being accessed by any entity upon receipt of a request by the customer to delete the data to be protected. The corresponding token may be invalidated upon receipt of a request by the customer to delete the data to be protected. A different token may be generated for the same data to be protected if associated with a different merchant ID. A different token may be generated for the same data to be protected if associated with a different customer ID.

In embodiments, a method may include receiving, by a tokenization engine, data to be protected which is provided by a data provider and obtained by or on behalf of a first data controller and determining a first data controller ID associated with the first data controller and a data provider ID associated with the data provider. The method may include generating, by the tokenization engine, a first token for the first data controller ID in combination with the data provider ID and in combination with the data to be protected, wherein the first token is a reference that maps back to the data to be protected and receiving, by the tokenization engine, the same data to be protected which is provided by the data provider and obtained by or on behalf of a second data controller. The method may further include determining a second data controller ID associated with the second data controller and generating, by the tokenization engine, a second token for the second data controller ID in combination with the data provider ID and in combination with the same data to be protected, wherein the second token is a reference that maps back to the data to be protected. The method may include storing the first data controller ID in combination with the data provider ID and the data to be protected in a data vault, wherein the data to be protected is accessible from the data vault when the first token is presented and storing the second data controller ID in combination with the data provider ID and the data to be protected in the data vault, wherein the data to be protected is accessible from the data vault when the second token is presented. The method may include receiving a request from the data provider to delete the data to be protected with respect to the first data controller, and in response to the request, preventing the data to be protected from being accessed with the first token.

In embodiments, the data to be protected may be personally identifiable information of the data provider. The data to be protected may be an email address, a phone number or a physical address. The method may include performing an audit, by the tokenization engine, of access to the data to be protected in the data vault.

In embodiments, a system may include a tokenization engine and a data vault. The tokenization engine may receive data to be protected which is provided by a data provider and obtained by or on behalf of a first data controller and may determine a first data controller ID associated with the first data controller and a data provider ID associated with the data provider. A first token may be generated for the first data controller ID in combination with the data provider ID and in combination with the data to be protected, wherein the first token is a reference that maps back to the data to be protected. The tokenization engine may receive the same data to be protected which is provided by the data provider and obtained by or on behalf of a second data controller and a second data controller ID associated with the second data controller may be determined and a second token for the second data controller ID in combination with the data provider ID and in combination with the same data to be protected may be generated, wherein the second token is a reference that maps back to the data to be protected. The data vault may store the first data controller ID in combination with the data provider ID and the data to be protected wherein the data to be protected is accessible from the data vault when the first token is presented, and may store the second data controller ID in combination with the data provider ID and the data to be protected, wherein the data to be protected is accessible from the data vault when the second token is presented. When a request is received from the data provider to delete the data to be protected with respect to the first data controller, then in response to the request, the tokenization engine may act to prevent the data to be protected from being accessed with the first token.

In embodiments, the data to be protected may be personally identifiable information of the data provider. The data to be protected may be an email address, a phone number or a physical address. The tokenization engine may perform an audit of access to the data to be protected in the data vault.

In embodiments, a method may include receiving, by a tokenization engine, first and second data to be protected and receiving, by the tokenization engine, a first data controller ID associated with a first data controller and a first data provider ID associated with the first data provider corresponding to the first data to be protected. The method may include receiving, by the tokenization engine, a second data controller ID associated with a second data controller and a second data provider ID associated with the second data provider corresponding to the second data to be protected. The method may include generating, by the tokenization engine, corresponding first token for the first data controller ID in combination with the first data provider ID and in combination with the first data to be protected, wherein the first token is a reference that maps back to the first data to be protected and generating, by the tokenization engine, a corresponding second token for the second data controller ID in combination with the second data provider ID and in combination with the second data to be protected, wherein the second token is a reference that maps back to the second data to be protected. The first data controller ID in combination with the first data provider ID and the first data to be protected may be stored in a data vault, wherein the first data to be protected is accessible from the data vault when the corresponding first token is presented. The second data controller ID in combination with the second data provider ID and the second data to be protected may be stored in the data vault, wherein the second data to be protected is accessible from the data vault when the corresponding second token is presented.

In embodiments, each of the first and the second data provider ID may comprise at least one of a ID kind and an ID value. Each of the first and the second data controller ID may comprise at least one of a controller kind, an ID kind, and an ID value.

In embodiments, a system may include a tokenization engine for receiving first and second data to be protected and a data vault for storing tokens. The tokenization engine may receive a first data controller ID associated with a first data controller and a first data provider ID associated with the first data provider corresponding to the first data to be protected, receive a second data controller ID associated with a second data controller and a second data provider ID associated with the second data provider corresponding to the second data to be protected, generate a corresponding first token for the first data controller ID in combination with the first data provider ID and in combination with the first data to be protected, wherein the first token is a reference that maps back to the first data to be protected. The tokenization engine may generate a corresponding second token for the second data controller ID in combination with the second data provider ID and in combination with the second data to be protected, wherein the second token is a reference that maps back to the second data to be protected. The data vault may store the first data controller ID in combination with the first data provider ID and the first data to be protected in a data vault, wherein the first data to be protected is accessible from the data vault when the corresponding first token is presented, and may store the second data controller ID in combination with the second data provider ID and the second data to be protected in the data vault, wherein the second data to be protected is accessible from the data vault when the corresponding second token is presented.

In embodiments, each of the first and the second data provider ID may comprise at least one of an ID kind and an ID value. Each of the first and the second data controller ID may comprise at least one of a controller kind, an ID kind, and an ID value.

In embodiments, a method may include receiving, by a tokenization engine, first and second data to be protected, receiving, by the tokenization engine, a data controller ID associated with a data controller and a data provider ID associated with the data provider corresponding to the first and second data to be protected, generating, by the tokenization engine, a corresponding first token for the data controller ID in combination with the data provider ID and in combination with the first data to be protected, wherein the first token is a reference that maps back to the first data to be protected, and generating, by the tokenization engine, a corresponding second token for the data controller ID in combination with the data provider ID and in combination with the second data to be protected, wherein the second token is a reference that maps back to the second data to be protected. The data controller ID in combination with the data provider ID and the first data to be protected may be stored in a data vault, wherein the first data to be protected is accessible from the data vault when the corresponding first token is presented. The data controller ID in combination with the data provider ID and the second data to be protected may be stored in the data vault, wherein the second data to be protected is accessible from the data vault when the corresponding second token is presented. In embodiments, the data provider ID may comprise at least one of a ID kind and an ID value. In embodiments, the data controller ID may comprise at least one of a controller kind, an ID kind, and an ID value.

In embodiments, a system may include a tokenization engine for receiving first and second data to be protected and a data vault for storing tokens. The tokenization engine may receive a data controller ID associated with a data controller and a data provider ID associated with the data provider corresponding to the first and second data to be protected, may generate a corresponding first token for the data controller ID in combination with the data provider ID and in combination with the first data to be protected, wherein the first token is a reference that maps back to the first data to be protected, may generate a corresponding second token for the data controller ID in combination with the data provider ID and in combination with the second data to be protected, wherein the second token is a reference that maps back to the second data to be protected. The data vault may store the data controller ID in combination with the data provider ID and the first data to be protected, wherein the first data to be protected is accessible from the data vault when the corresponding first token is presented. The data vault may store the data controller ID in combination with the data provider ID and the second data to be protected, wherein the second data to be protected is accessible from the data vault when the corresponding second token is presented.

In embodiments, the data provider ID may comprise at least one of an ID kind and an ID value. In embodiments, the data controller ID may comprise at least one of a controller kind, an ID kind, and an ID value.

BRIEF DESCRIPTION OF THE FIGURES

FIG. 5 depicts exemplary data in a data vault.

FIG. 6 depicts a table showing an exemplary tokenization process that takes into account data controller ID, data provider ID and sensitive data.

DETAILED DESCRIPTION

The present disclosure will now be described in detail by describing various illustrative, non-limiting embodiments thereof with reference to the accompanying drawings. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

The present disclosure will now be described in detail by describing various illustrative, non-limiting embodiments thereof with reference to the accompanying drawings. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
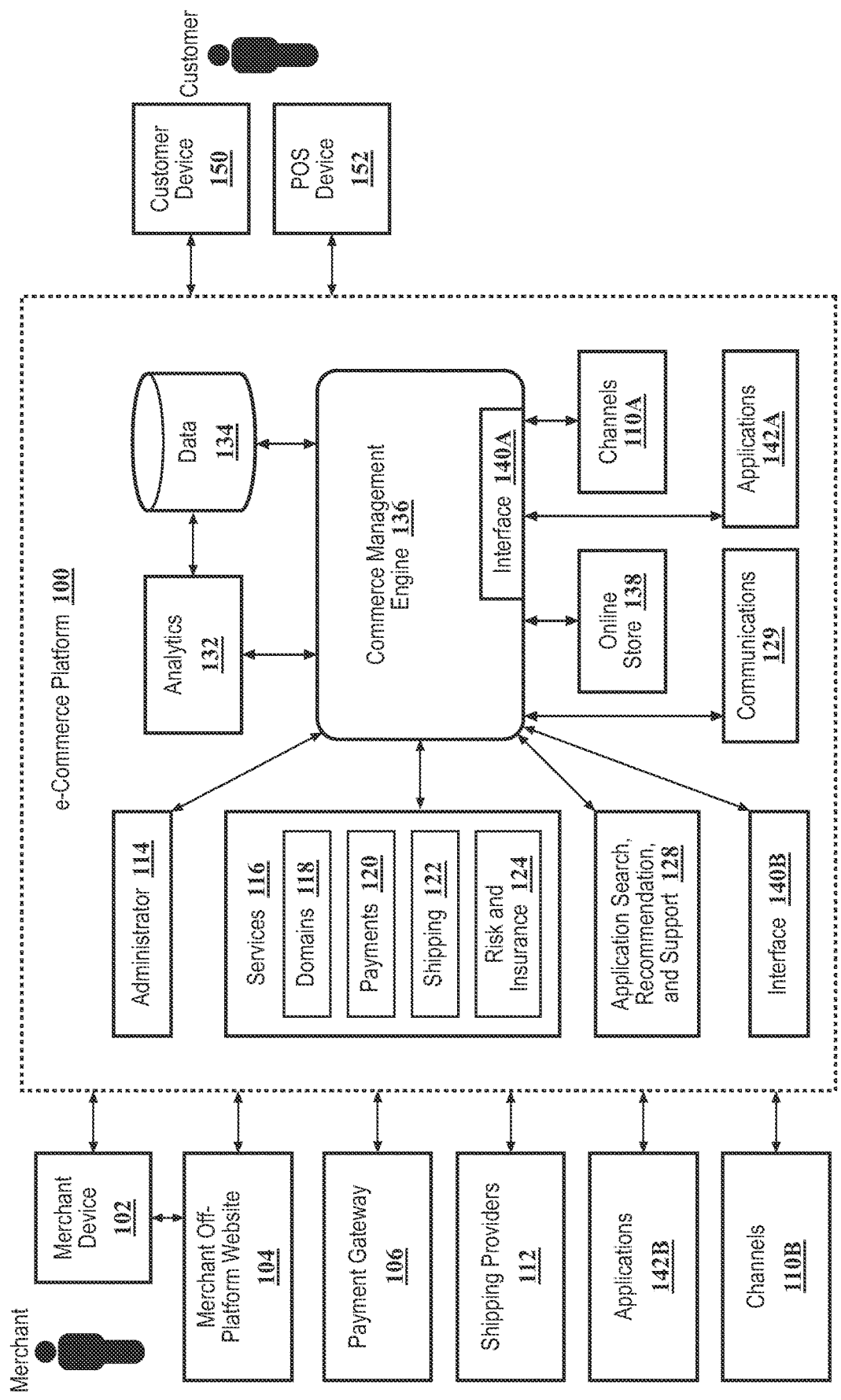
FIG. 1 depicts an embodiment of an e-commerce platform.

With reference to FIG. 1, an exemplary e-commerce platform 100 is depicted for providing merchant products and services to customers. While the disclosure throughout contemplates using the apparatus, system, applications, and process disclosed to view, evaluate, and purchase both products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and evaluating products and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through applications 142A-B, through channels 110A-B, through point of sale (POS) devices 152 in physical locations (e.g., a physical storefront or other location such as through a kiosk, terminal, reader, printer, 3D printer, and the like), by managing their business through the e-commerce platform 100, by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other Internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through various features of the platform or stand-alone applications, dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted hosted (e.g., accessed by users using a client, such as a thin client, via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality). In embodiments, features or applications of or associated with the platform may be implemented via a peer to peer network, such as between a customer device and a merchant device.

In embodiments, the online store 138 may be served to a customer device 150 through a webpage provided by a server of the e-commerce platform 100. The server may receive a request for the webpage from a browser or other application on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g., as data facility 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator component 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
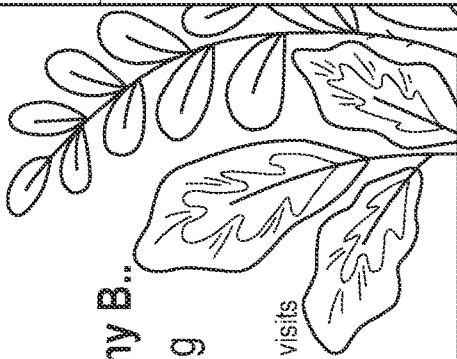
FIG. 2 depicts an embodiment of a home page of an administrator.

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g., via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

Sensitive data may be transmitted to, generated by, and accessed at various points by the e-commerce platform 100 and communicated to and/or from various entities in communication with the e-commerce platform 100, including both customers and merchants. Sensitive data, or data to be protected, as used herein, may include data to be protected against unwarranted disclosure, and may encompass many types of data such as personally identifiable information (PII), personal information, medical and health information, names, mailing addresses, phone numbers, email addresses, government identification numbers, user names, marital status, gender, relationships with others, financial data, and the like. Such data may reside at different places in the e-commerce platform 100 and be associated with various data facilities or storage services such as HDFS (Hadoop Distributed File System), Amazon S3, log files, RDBSs (relational database systems), and the like. Different entities and/or privacy laws may require protection of this information. For example, HIPAA (Health Insurance Portability and Accountability Act) is U.S. legislation that provides data privacy and security provisions for safeguarding medical information. Under Europe's GDPR (General Data Protection Regulation), a data controller has a responsibility to protect the privacy and rights of the data's owner, including personally identifiable information (PII). A data controller controls the procedures and purpose of the data usage and controls how data is going to be used by the organization, though may also work with a third party or other service with respect to the data to be protected. A data processor may process data that the data controller gives them. For example, a data processor may be a third-party company that the data controller chooses to use and process the data but a data processor is bound by instructions given by the data controller. For example, a merchant may choose to use services of an analytics company (e.g., Google Analytics) to evaluate which pages are most popular in order to help better plan content of pages. The merchant (or an entity acting on behalf of the merchant) may be a data controller, while the analytics company is considered a data processor. In some cases, the e-commerce platform 100 may be the data controller.

In some systems, it may be difficult to track, audit, report, and/or delete sensitive data across the entirety of the e-commerce platform. Regulations such as GDPR require the ability to report or delete PII or other sensitive data (or portions thereof) upon request. In the case of the e-commerce platform 100, which may store the same customer data across multiple merchants, a customer may desire deletion of some or all sensitive data with respect to one merchant but not another. For example, a customer may want all sensitive data deleted by one merchant, deletion of some sensitive data (such as a telephone number or email address) by a second merchant, and may want to allow a third merchant to keep all sensitive data. Therefore, a central service for protecting such information is desirable in order to securely store, retrieve, and report on the sensitive data, eliminate any sensitive data upon request, with the ability to selectively delete portions of sensitive data and selectively delete with respect to various entities. Also desirable is a central service with the ability to authenticate, authorize, and audit access to sensitive data. Prior art tokenization systems are inadequate in that they do not have data stored at a merchant level and thus are not able to fine tune deletion requests, such as when a customer has sensitive data stored with multiple merchants but wants to remove all or certain information at one merchant only. Further, prior art tokenization systems may be prone to data leakage.

An improved tokenization system with a tokenization engine and a data vault may centralize the collection, access, and management of data to be protected across the e-commerce platform. The tokenization engine may provide a corresponding token for data to be protected (e.g., PII) in combination with other information, such as a data controller ID and/or a data provider (data owner or data subject) ID. A token may be a randomly generated number. The tokenization engine provides the same token for the same input data (i.e., for the same combination of specific data to be protected, data controller ID, and data provider ID) and provides a different token for the same data to be protected when the data controller ID or the data provider ID is different. The tokenization engine may control storage of the tokenized data in the data vault, and control release of the tokenized data from the data vault upon request by an entity in possession of the corresponding token by authenticating the token and authorizing the access. The tokenization engine allows for reporting and deleting sensitive data in a more precise and targeted manner, in part by centralizing collection of sensitive data in combination with the manner of token generation. Auditing the storage of and any access to sensitive data may be achieved in an efficient and straight-forward manner. Further, the potential for data leakage is diminished since more tokens are generated for the same data due to tokens being generated for data to be protected in combination with a corresponding data controller ID and data provider ID.

In embodiments, the e-commerce platform 100 may receive and store sensitive data from a customer and/or from a merchant. This information needs to be protected and stored in a secure manner, with appropriate access allowed. This information also needs to be deleted upon the request of the data provider. An improved tokenization application, as part of or separate from the e-commerce platform 100, may act to tokenize data to be protected in such a manner to meet these objectives.

Figure 3:
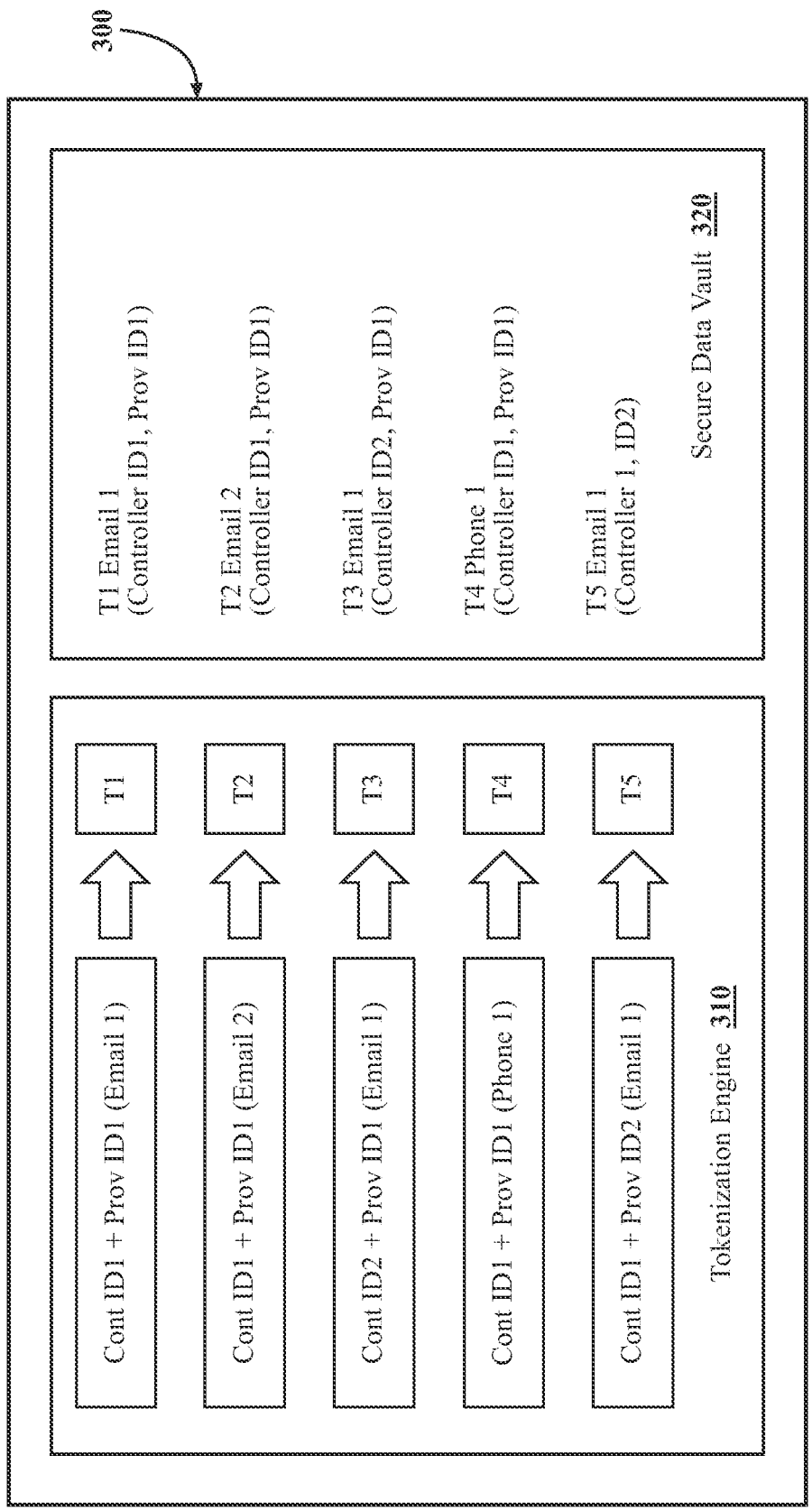
FIG. 3 depicts an embodiment of a tokenization application and illustrates an exemplary tokenization process.

FIG. 3 depicts an exemplary tokenization application 300 with a tokenization engine 310 and a data vault 320 for securely storing sensitive data. In embodiments, the data vault described herein may be a secure data vault. Also illustrated in FIG. 3 is an exemplary tokenization process, wherein sensitive data, such as an email address or a phone number, is tokenized based on a controller ID (such as associated with a merchant who controls the sensitive data or associated with the e-commerce platform 100 that controls the sensitive data) and based on a data provider ID relating to the subject of the data (such as a customer ID associated with the customer who provides the sensitive data or a merchant ID associated with a merchant whose data is to be protected). The tokenization engine may receive data to be protected, such as a data provider's email address, mailing address, phone number, or the like, which may be, for example, associated with a customer's purchase of a product from a merchant. The data to be protected may also be associated with a merchant of the e-commerce platform 100.

For each piece of sensitive data to be tokenized, the tokenization engine receives or determines a corresponding data provider ID (such as a customer ID associated with the customer or a merchant ID associated with a merchant) and a corresponding controller ID (such as a merchant ID associated with the merchant or a controller ID associated with the e-commerce platform) in connection with the data to be protected. The tokenization engine then determines a corresponding token for the provider ID in combination with the controller ID and in combination with the data to be protected. The same token is generated if the same provider ID, same controller ID, and same data to be protected is presented. A different corresponding token is generated for each separate triplet of (provider ID, controller ID, data to be protected). In this case, a different token is generated for the same data to be protected if the provider ID or the controller ID is different. The granularity of the data to be protected can vary, but in embodiments protection may be separately provided for a physical address, an email address, and a phone number of a data provider, such as described in more detail below.

A generated token may be, for example, at least in part a random number, without any form of relation to the original data to be protected, and without a relationship to other data to be protected. An exemplary token may be 64 bytes, which may include a 32 byte of HMAC-SHA256 signature (which ensures the integrity and authenticity of the token, with only the tokenization engine able to calculate the signature), 1 byte indicating a corresponding version, 2 bytes indicating a corresponding Key version, a partition ID, 16 bytes of a random number, up to 13 bytes that are reserved. Many other token forms are possible.

The tokenization engine is enabled to generate tokens, and track and log all accesses to the data vault, wherein the tracking information includes corresponding api_key, auth_token, date, and event type.

As an example of providing a different corresponding token for each separate triplet of (provider ID, controller ID, data to be protected), and referring to FIG. 3, if a customer named Jane Smith (Provider ID1) has two email addresses, jsmith@acme.com (Email 1) and jane.smith@acme.net (Email 2), and provides both to a first merchant, with Controller ID1, two different tokens (T1 and T2) will be generated by the tokenization engine. Each email address will be stored in the data vault in association with its corresponding token, T1 or T2 (and Controller ID1 and Provider ID1).

If Jane Smith (Provider ID1) then provides Email 1 to a second merchant with a Controller ID2, another token (T3) will be generated and the email address Email 1 will be stored in the data vault with its corresponding token, T3 (and Controller ID 2 and Provider ID1).

If Jane Smith (Provider ID1) also provides a phone number to the first merchant, Controller ID1, a further token (T4) will be generated and the phone number stored in the vault with its corresponding token, T4 (and Controller ID1 and Provider ID1).

If John Smith (Provider ID2) uses the same email address, jsmith@acme.com (Email 1), as Jane Smith, and provides this email address to the first merchant with Controller ID1, a further token (T5) will be generated and the email address Email 1 will be stored in the vault with its corresponding token, T5 (and Provider ID2 and Controller ID1).

Figure 4:
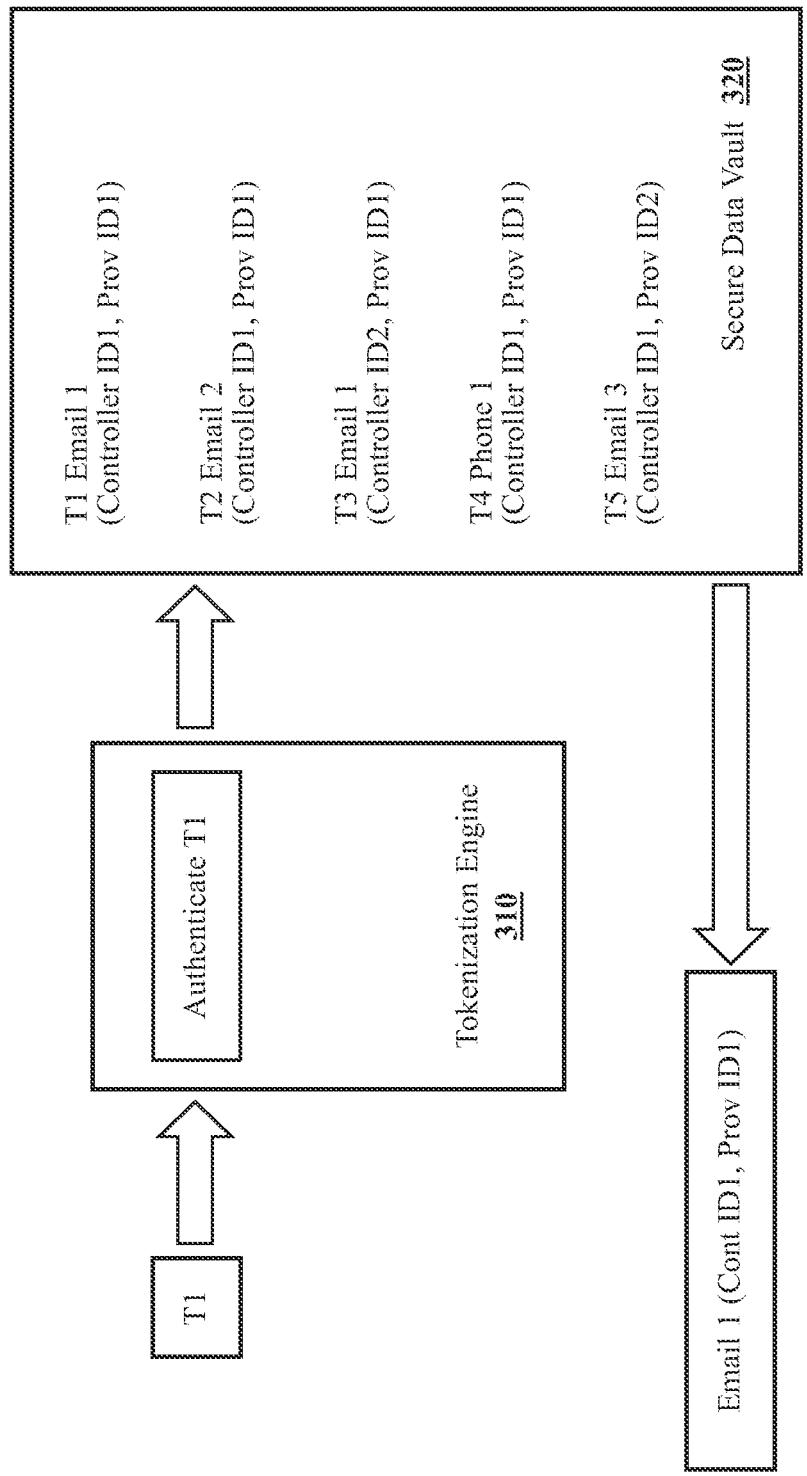
FIG. 4 depicts the embodiment of the tokenization application of FIG. 3 and illustrates an exemplary detokenization process.

FIG. 4 depicts the exemplary tokenization application of FIG. 3, wherein an exemplary detokenization process is depicted. When a token is presented to the tokenization engine, the tokenization engine may authenticate the token and if it is authenticated, the tokenization engine may determine the data in the data vault that corresponds to the token, wherein the corresponding data is then presented to the token holder or to another entity authorized by the token holder.

The tokenization application 300 may expose a simple API to add, retrieve, delete, and report sensitive data. The API is may be exposed internally to the e-commerce platform 100 and may require authentication for entities to interact with it. In embodiments, an interaction with the tokenization application may require an api_key and an auth_token, wherein the api_key controls access to the functionality of the application, and the auth_token is a vault identifier, which may be generated per entity, such as individual or machine. These may be generated by a system administrator or be generated automatically using other forms of authentication such as accounts associated with the e-commerce platform 100.

This manner of token generation allows for selective deletion of sensitive data upon request by a data provider. For example, if Jane Smith (Provider ID1) desires that her Email 1 be deleted in connection with a merchant having Controller ID2, the tokenization engine determines the token associated with the triplet (Controller ID2, Provider ID1, and Email 1), and may delete or disable this token, and/or may delete the associated data in the vault associated with the token, while the other tokens associated with Email 1 remain unaffected. By tying a token to other data fields (e.g., a controller ID and a provider ID) in addition to the data to be protected allows for greater specificity to be achieved with deletion requests, including at a merchant level.

FIG. 5 depicts an example of storing information in an exemplary data vault, wherein a data provider that provides data to be protected may have a corresponding Controller ID based on a corresponding ID type (such as a merchant or a customer) and a corresponding ID value for that data type. A request to the tokenization application to tokenize data from a merchant with a Shop ID of 123 to be stored in the data vault as shown in row 1 of FIG. 5 may take a form such as:

| Request 1: |
|---|
| { Shop_id:123  Postal code: K15GT3  Phone: 222-333-4444  Email: john@smith.com  Supp Email: support@smith.com  ... } |

Similarly, a request to the tokenization application to tokenize data from a customer with a Buyer ID of 456 to be stored in the data vault as shown in row 2 of FIG. 5 may take a form such as:

| Request 2: |
|---|
| { Buyer_id:456  Postal code: K15GT3  Phone: 777-888-9999  Email: jack@jones.com  ... } |

In this case, as shown in FIG. 5, the various pieces of sensitive data corresponding to a data provider, such as email address, zip code, and phone number or the like, each have a corresponding token associated with it, wherein a corresponding token is generated for each piece of data in connection with a data provider ID. The sensitive data in other databases of the e-commerce platform 100 may then be replaced with a token, such as shown below:

| Request 1: |
|---|
| { Shop_id:123  Postal code: sdfs1231...11  email: 369053fb ... 43  Supp email: 234dsfgd ...19  Phone: pppxss ...22  ... } |

FIG. 6 illustrates an exemplary process for tokenization. In some embodiments, a controller ID may be composed of one or more subparts, including for example a controller kind (such as e-commerce platform or merchant or partner), an ID kind (such as a shop ID or a partner ID), and an ID value (such as a number or other alphanumeric value). Similarly, a data provider ID may be composed of one or more subparts, including for example an ID kind (such as a customer ID or email) and a corresponding ID value for the ID kind (such as a number or specific email address).

With such subparts for controller ID, where the e-commerce platform is the controller, as shown in the first four rows of FIG. 6, a controller ID kind and ID value is not necessary to differentiate among controllers because there is only a single e-commerce platform. This allows for the same token to be generated for the same sensitive data and same data provider across all the applications controlled by the e-commerce platform if the e-commerce platform is the data controller.

As illustrated in rows 5 to 7 of FIG. 6, merchants and partners can be differentiated from each other and each controller of those kinds may require an ID value to uniquely identify themselves.

Additionally, rows 1 and 2 of FIG. 6 represent the same person or entity (a data provider) that has data controlled by the e-commerce platform, such as for example, payment data details via a payment application of the platform. Row 1 shows a token is generated corresponding to the data provider and person's address, and row 2 shows a different token is generated for the same data provider's email. Similarly, rows 1 and 3 show two different data providers (different IDs) under the same controller (e-commerce platform) that happen to live at the same address (same sensitive data). But a different token is generated for each for that same sensitive data. Rows 3 and 4 show the same data provider (same controller and same ID) and same sensitive data kind (address) but different values for the sensitive data itself, such as could occur if the data provider moved from a first address to a second address. Each address will produce a different token. Rows 5 and 6 show that the same data provider under different controllers, for the same sensitive data will produce different tokens (e.g., the same person shopping from two different shops).

As described herein, merchants may include various applications and modules of the e-commerce platform 100 in order to create an on-line shop for the sale of product, allowing for the customization of the shop. As described herein, the e-commerce platform 100 includes functionality to allow for the tokenization of sensitive data associated with each merchant as well as each customer. In other words, the data provider of sensitive data to be protected may also be a merchant. In such a case, the data controller is the e-commerce platform 100, which would also have a corresponding controller ID. Tokenization functionality may be achieved by integrating privacy handlers (e.g., the tokenization application) with the schema for creating a merchant shop or a schema for providing a service to the merchant shop and providing a way to specify an appropriate affiliation between the data controller and the data provider in each case. Different ways to achieve this include providing an affiliation on a per-schema basis and/or providing an affiliation on a per-field basis (wherein the field relates to the data to be protected), as further described below.

For example, consider the following schema for a merchant, wherein it is desired to provide tokenization by the tokenization engine for the physical address of a merchant as well as the email address of a merchant:

```
name: 10f_signup_request
doc: Triggered when merchants complete the ...
version: 1.0
format: json
fields:
...
- name: shop_id
  type: long
  doc: Unique identifier for a shop.
- name: shop_contact_address1
  type: string
  optional: true
  doc: Street address for the shop's default business address.
  privacy_handlers: TOKENIZE_ADDRESS
-  name: shop_contact_email
   type: string
```

-continued

```
   doc: Shop contact email
   privacy_handlers: TOKENIZE_EMAIL
...
```

Using a per-schema affiliation approach, the affiliation between the data controller and the data provider is specified only once in the schema and every tokenized field will share that affiliation information. In this case, the previous schema becomes:

```
name: 10f_signup_request
doc: Triggered when merchants complete the...
version: 1.0
format: json
fields:
...
- name: shop_id
  type: long
  doc: Unique identifier for a shop.
- name: shop_contact_address1
  type: string
  optional: true
  doc: Street address for the shop's default business address.
  privacy_handlers: TOKENIZE_ADDRESS
- name: shop_contact_email
  type: string
  doc: Shop contact email
  privacy_handlers: TOKENIZE_EMAIL
...
--Affiliation
Controller ID: Controller ID associated with e-commerce platform
ProviderID:
Kind: Shop_ID
Value(field): "shop_id"
```

In other words, the Provider ID in this case corresponds to a ShopID with a specified value. This approach is succinct and only requires that a Provider ID be specified once per schema and all tokenized fields will inherit that. Note, in this specific case, merchant information is that data to be protected that is to be tokenized, and the e-commerce platform 100 is the controller. A possible disadvantage of this approach is that it allows only one controller and provider identifier in one schema. Therefore, schemas that might have more than one data provider (data subject) in them or a different controller would not be supported. For instance, consider the following schema:

```
name: tax_entrypoint_experiment
doc: Events related to incorrect tax lines from new tax component entry point.
fields:
...
- name: shop_id
  type: long
  doc: Shop ID of taxable object.
- name: customer_id
  type: kind
  doc: customer id of taxable object
- name: origin_address
  type: string
  optional: true
  doc: origin address which is merchant address
  privacy_handlers: TOKENIZE_ADDRESS
- name: destination_address
  type: string
  optional: true
  Doc: destination address
  privacy_handlers: TOKENIZE_ADDRESS
...
```

In this schema, there are two tokenized fields that belong to two different data providers (data subjects) under two different controllers. In this example, an origin address, which corresponds to a merchant address and belongs to the merchant as the data provider, is data to be protected that is controlled by the e-commerce platform 100. Further, there is a destination address that belongs to a customer as a data provider and is controlled by the merchant. The aforementioned per-schema affiliation won't work because the affiliation information is not shared across all the fields. In such a case, another method as set forth below provides the necessary flexibility to create appropriate affiliations.

```
name: tax_entrypoint_experiment
doc: Events related to incorrect tax lines from new tax component entry point.
fields:
...
- name: shop_id
type: long
doc: Shop ID of taxable object.
- name: customer_id
type: kind
doc: customer id of taxable object
- name: origin_address
type: string
optional: true
doc: origin address which is merchant address
privacy: {
handler: TOKENIZE_ADDRESS,
controller: {
Kind: e-commerce platform,
ID: "",
},
ProviderID: {
Kind: shop_id,
Value: "shop_id"
}
}
- name: destination_address
type: string
optional: true
Doc: destination address
privacy: {
handler: TOKENIZE_ADDRESS,
controller: {
Kind: MERCHANT,
ID: {
Kind: shop_id,
Value: shop_id
}
},
ProviderID: {
Kind: customer_id,
Value: "customer_id"
}
}
...
```

This approach allows appropriate affiliations to be generated for varying combinations of a Controller ID (possibly with subparts) and a Provider ID (possibly with subparts) for different data to be protected. In this manner, different data providers, including the merchants associated with the e-commerce platform 100, may have sensitive data tokenized and replaced with tokens in other places of the e-commerce platform 100. Data providers including the customers associated with the merchants will have their sensitive data tokenized as well and replaced with tokens in other places of the e-commerce platform 100. This allows data analysts to use sensitive data that is tokenized for various analyses.

Both a per-schema affiliation and a per-field affiliation for tokenization can be supported. Rules may exist such that per-field affiliation would take precedence over schema-level affiliations. Further, checks may be put in place to validate schemas at creation time so as to prevent contradictory and/or missing affiliations.

In embodiments, both obfuscated data and tokenized data may exist, obfuscated data may be tokenized or used in the tokenization process and tokens may be obfuscated. For example, tokenizing 'bobsmith1234@gmail.com would result in:
  Tok: "f234b1j-lkj1j- . . . -1j232",
  Obf: "REDACTED@gmail.com"

In embodiments, if all affiliation data is not present in the schema, then the schema will not have tokenized data in it. In embodiments, if affiliation information is missing, the tokenized data may be 'redacted'. In embodiments, if information or data relevant to the tokenization process is missing or unavailable, then placeholder information or data may be used in its place.

While the disclosure throughout generally contemplates a tokenization system for use in an e-commerce platform, such systems and methods can be generalized to other use cases, such as for storage of secure data in healthcare systems or other systems wherein a targeted deletion scheme for sensitive data can be achieved.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include $4^{th}$ Generation (4G) networks (e.g. Long Term Evolution (LTE)) or $5^{th}$ Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A computer-implemented method comprising:
    receiving, at a computer system, sensitive data to be protected by, stored by, accessed using, and managed by the computer system, the sensitive data being provided by a data provider computing device and being obtained by or on behalf of data controllers;
    at the computer system, protecting the sensitive data a plurality of times, at least once per data controller, by:
        determining data controller IDs associated with respective data controllers and data provider IDs associated with respective data providers associated with data provider computing devices;
        generating tokens corresponding to triplets of data controller IDs, data provider IDs, and the sensitive data to be protected by generating, for a given token of the tokens, a unique value that is not decipherable and does not have a relationship to other sensitive data to be protected, wherein the generating generates different tokens for each separate triplet of data controller ID, data provider ID and sensitive data to be protected, and tokens are references that map back to the respective sensitive data protected in association with corresponding data controller IDs;
    at the computer system, storing the sensitive data to be protected in a data vault storage medium a plurality of times, each time in combination with the respective one of the data controller IDs and the data provider ID, wherein the sensitive data is accessible from the data vault storage medium by presentation to and authentication of any corresponding one of the plurality of tokens by the computer system; and at the computer system, accessing and managing the sensitive data by:
  receiving an electronic communication comprising a first token of the plurality of tokens and a request by the data provider computing device to delete the sensitive data that has been protected in the data vault storage medium in association with the first token; and
  authenticating the first token and selectively deleting or invalidating the first token and the sensitive data for the corresponding data controller ID based on the request, while other of the plurality of tokens associated with the data provider ID remain unaffected.

2. The computer-implemented method of claim 1, wherein the at least one data provider is one of a merchant and a customer of a merchant.

3. The computer-implemented method of claim 1, wherein respective data controllers are one of an e-commerce platform and a merchant.

4. The computer-implemented method of claim 1, wherein corresponding tokens are generated using the data controller IDs, the data provider IDs, and the data to be protected as inputs to a tokenization process.

5. The computer-implemented method of claim 1, further comprising authenticating access to the data to be protected responsive to receipt of the corresponding tokens.

6. The computer-implemented method of claim 1, wherein placeholder data is provided in a case of a missing data controller ID and in a case of a missing data provider ID.

7. The computer-implemented method of claim 1, wherein the data to be protected in the data vault storage medium is deleted.

8. The computer-implemented method of claim 1, further comprising preventing the data to be protected from being accessed by any entity upon receipt of a request by the data provider to delete the data to be protected.

9. The computer-implemented method of claim 1, further comprising transmitting at least one data provider ID and a corresponding token for storage in a database of an e-commerce platform.

10. The computer-implemented method of claim 1, wherein the data provider IDs comprise at least one of an ID kind and an ID value.

11. The computer-implemented method of claim 1, wherein respective data controller IDs comprise at least one of a controller kind, an ID kind, and an ID value.

12. The computer-implemented method of claim 1, further comprising receiving and authenticating tokens, and authorizing a data analysis to be performed on the data controllers and the data providers using the data to be protected when the corresponding token is authenticated.

13. The computer-implemented method of claim 1, wherein the data to be protected is personally identifiable information of the data provider, an email address, a phone number, or a physical address.

14. A computer system comprising:
at least one processor; and
a computer-readable medium storing instructions that when executed by the at least one processor, enable the computer system to:
  receive sensitive data to be protected by, stored by, accessed using, and managed by the computer system, the sensitive data being provided by a data provider computing device and being obtained by or on behalf of data controllers;
  protect the sensitive data a plurality of times, at least once per data controller, by:
    determining data controller IDs associated with respective data controllers and data provider IDs associated with respective data providers associated with data provider computing devices;
    generating tokens corresponding to triplets of data controller IDs, data provider IDs, and the sensitive data to be protected by generating, for a given token of the tokens, a unique value that is not decipherable and does not have a relationship to other sensitive data to be protected, wherein the generating generates different tokens for each separate triplet of data controller ID, data provider ID and sensitive data to be protected sensitive data to be protected, and tokens are references that map back to the respective sensitive data protected in association with corresponding data controller IDs;
  have the sensitive data to be protected stored in a data vault storage medium a plurality of times, each time in combination with the respective one of the data controller IDs and the data provider ID, wherein the sensitive data is accessible from the data vault storage medium by presentation to and authentication of any corresponding one of the plurality of tokens by the computer system; and
  access and manage the sensitive data by:
    receiving an electronic communication comprising a first token of the plurality of tokens and a request by the data provider computing device to delete the sensitive data that has been protected in the data vault storage medium in association with the first token; and
    authenticating the first token and selectively deleting or invalidating the first token and the sensitive data for the corresponding data controller ID based on the request, while other of the plurality of tokens associated with the data provider ID remain unaffected.

15. The computer system of claim 14, wherein the computer system is further enabled to authenticate access to the data to be protected responsive to receipt of the corresponding tokens.

16. The computer system of claim 14, wherein placeholder data is provided in a case of a missing data controller ID and in a case of a missing data provider ID.

17. The computer system of claim 14, wherein the data to be protected in the data vault storage medium is deleted.

18. The computer system of claim 14, wherein the computer system is further enabled to prevent the data to be protected from being accessed by any entity upon receipt of a request by the data provider to delete the data to be protected.

19. The computer system of claim 14, wherein the computer system is further enabled to receive and authenticate tokens, and authorize a data analysis to be performed on the data controllers and the data providers using the data to be protected when the corresponding token is authenticated.

20. A non-transitory computer-readable medium storing instructions that, when executed by a processor of a computer system, cause the computer system to:
  receive sensitive data to be protected by, stored by, accessed using, and managed by the computer system, the sensitive data being provided by a data provider computing device and being obtained by or on behalf of data controllers;
protect the sensitive data a plurality of times, at least one per data controller, by:
  determining data controller IDs associated with respective data controllers and data provider IDs associated with respective data providers associated with data provider computing devices;
  generating tokens corresponding to triplets of data controller IDs, data provider IDs, and the sensitive data to be protected by generating, for a given token of the tokens, a unique value that is not decipherable and does not have a relationship to other sensitive data to be protected, wherein the generating generates different tokens for each separate triplet of data controller ID, data provider ID and sensitive data to be protected, and tokens are references that map back to the respective sensitive data protected in association with corresponding data controller IDs;
store the sensitive data to be protected in a data vault storage medium a plurality of times, each time in combination with the respective one of the data controller IDs and the data provider ID, wherein the sensitive data is accessible from the data vault storage medium by presentation to and authentication of any corresponding one of the plurality of tokens by the computer system; and
access and manage the sensitive data by:
  receiving an electronic communication comprising a first token of the plurality of tokens and a request by the data provider computing device to delete the sensitive data that has been protected in the data vault storage medium in association with the first token; and
  authenticating the first token and selectively deleting or invalidating the first token and the sensitive data for the corresponding data controller ID based on the request, while others of the plurality of tokens associated with the data provider ID remain unaffected.

* * * * *